United States Patent
Hong

(10) Patent No.: US 12,382,427 B2
(45) Date of Patent: Aug. 5, 2025

(54) PAGING METHOD AND APPARATUS

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 450 days.

(21) Appl. No.: 17/595,314

(22) PCT Filed: May 23, 2019

(86) PCT No.: PCT/CN2019/088180
§ 371 (c)(1),
(2) Date: Nov. 13, 2021

(87) PCT Pub. No.: WO2020/232712
PCT Pub. Date: Nov. 26, 2020

(65) Prior Publication Data
US 2022/0210764 A1 Jun. 30, 2022

(51) Int. Cl.
*H04W 68/00* (2009.01)
*H04W 8/26* (2009.01)
*H04W 28/086* (2023.01)
*H04W 68/02* (2009.01)

(52) U.S. Cl.
CPC .......... *H04W 68/005* (2013.01); *H04W 8/26* (2013.01); *H04W 28/0861* (2023.05); *H04W 68/02* (2013.01)

(58) Field of Classification Search
CPC .......... H04B 7/02; H04B 7/04; H04B 7/0413; H04B 7/0452; H04W 88/00; H04W 88/02; H04W 88/06
See application file for complete search history.

(56) References Cited

U.S. PATENT DOCUMENTS

| | | | |
|---|---|---|---|
| 8,958,847 B2 * | 2/2015 | Sanka | H04W 4/16 455/558 |
| 9,094,899 B2 * | 7/2015 | Smith | H04W 48/17 |
| 2012/0108273 A1 | 5/2012 | Lee | |

(Continued)

FOREIGN PATENT DOCUMENTS

| | | |
|---|---|---|
| CN | 101553055 A | 10/2009 |
| CN | 101815352 A | 8/2010 |
| CN | 101888697 A | 11/2010 |

(Continued)

OTHER PUBLICATIONS

International Search Report in the international application No. PCT/CN2019/088180, mailed on Feb. 13, 2020.

(Continued)

*Primary Examiner* — Diana J. Cheng
(74) *Attorney, Agent, or Firm* — Syncoda LLC; Feng Ma

(57) ABSTRACT

A paging method, includes: in response to determining that user equipment (UE) to which a Subscriber Identification Module (SIM) card to be paged belongs is multi-SIM user equipment and multiple SIM cards of the multi-SIM UE belong to a same network operator's network, determining a first base station accessed by the connected SIM card of the multi-SIM user equipment; and sending paging signaling for paging the SIM card to be paged to the first base station.

13 Claims, 11 Drawing Sheets

(56) References Cited

U.S. PATENT DOCUMENTS

2013/0303139 A1   11/2013  Helfre
2015/0281926 A1   10/2015  Liu et al.

FOREIGN PATENT DOCUMENTS

| CN | 102143584 A | 8/2011 |
|---|---|---|
| CN | 104796963 A | 7/2015 |
| CN | 105072706 A | 11/2015 |
| CN | 105338178 A | 2/2016 |
| CN | 106793089 A | 5/2017 |
| WO | 2018121920 A1 | 7/2018 |

OTHER PUBLICATIONS

First Office Action of the Chinese application No. 201980000883.7, issued on Jul. 28, 2021.
Second Office Action of the Chinese application No. 201980000883.7, issued on Jan. 19, 2022.
Written Opinion of the International Search Authority in the international application No. PCT/CN2019/088180, mailed on Feb. 13, 2020.

\* cited by examiner

PAGING METHOD AND APPARATUS

CROSS-REFERENCE TO RELATED APPLICATIONS

This application is a U.S. national stage of International Application No. PCT/CN2019/088180 filed on May 23, 2019, the disclosure of which is hereby incorporated by reference in its entirety.

BACKGROUND

In a related art, processing manners with respect to a multi-SIM User Equipment (UE) are mainly implemented by each terminal manufacturer, and thus terminal behaviors and the processing manners with respect to the multi-SIM UE of different manufacturers are different in most cases, e.g., dual Subscriber Identification Module (SIM) single standby, dual SIM dual standby single active, and dual SIM dual standby dual active. A dual-SIM dual-standby terminal may usually apply for two International Mobile Equipment Identities (IMEIs), namely each International Mobile Subscriber Identification Number (IMSI) of the dual-SIM dual-standby terminal corresponds to an IMEI. Therefore, it might be a problem that a network regards different SIM cards of the same multi-SIM UE as different terminals, and furthermore, a Tracking Area (TA) List broadcast paging method may be used when the network pages the multi-SIM UE.

When multiple SIM cards of multi-SIM UE belong to the same network operator's network, paging the multi-SIM UE using the TA List broadcast paging method may bring up a problem that high signaling load and paging resource waste of a paging channel.

SUMMARY

Embodiments of the present disclosure provide a paging method and apparatus.

According to a first aspect of the present disclosure, a paging method is provided, which may be applied to a core network device and include: in response to determining that UE to which a SIM card to be paged belongs is multi-SIM UE and multiple SIM cards of the multi-SIM UE belong to a same network operator's network, determining a first base station currently accessed by the multi-SIM UE; and sending paging signaling of paging the SIM card to be paged to the first base station.

According to a second aspect of the present disclosure, a paging method is provided, which may be applied to a base station and include: receiving UE information of the multi-SIM UE, reported by multi-SIM UE through access stratum signaling, where the UE information of the multi-SIM UE includes at least one of: IMSIs of SIM cards of the multi-SIM UE, or IMEIs corresponding to the SIM cards; and reporting the UE information of the multi-SIM UE to a core network device.

According to a third aspect of the present disclosure, a paging method is provided, which may be applied to multi-SIM UE and include: generating reporting signaling including UE information of the multi-SIM UE, the UE information of the multi-SIM UE including at least one of: IMSIs of SIM cards of the multi-SIM UE, or IMEIs corresponding to the SIM cards; and sending the reporting signaling.

According to a fourth aspect of the present disclosure, a core network device is provided, which may include: a processor; and a memory configured to store instructions executable by the processor; where the processor may be configured to: in response to determining that UE to which a SIM card to be paged belongs is multi-SIM UE and multiple SIM cards of the multi-SIM UE belong to a same network operator's network, determine a first base station currently accessed by the multi-SIM UE; and send paging signaling of paging the SIM card to be paged to the first base station.

According to a fifth aspect of the present disclosure, a base station is provided, which may include: a processor; and a memory configured to store instructions executable by the processor; where the processor may be configured to: receive UE information of the multi-SIM UE, reported by multi-SIM UE through access stratum signaling, where the UE information of the multi-SIM UE includes at least one of: IMSIs of SIM cards of the multi-SIM UE, or IMEIs corresponding to the SIM cards; and report the UE information of the multi-SIM UE to a core network device.

According to a sixth aspect of the present disclosure, multi-SIM UE is provided, which may include: a processor; and a memory configured to store instructions executable by the processor; the processor may be configured to: generate reporting signaling including UE information of the multi-SIM UE, the UE information of the multi-SIM UE including at least one of: IMSIs of SIM cards of the multi-SIM UE, or IMEIs corresponding to the SIM cards; and send the reporting signaling.

According to a seventh aspect of the present disclosure, a non-transitory computer-readable storage medium is provided, which may have computer instructions stored therein, the instructions may be executed by a processor to implement the paging method provided in the first aspect.

According to an eighth aspect of the present disclosure, a non-transitory computer-readable storage medium is provided, which may have computer instructions stored therein, the instructions may be executed by a processor to implement the paging method provided in the second aspect.

According to a ninth aspect of the present disclosure, a non-transitory computer-readable storage medium is provided, which may have computer instructions stored therein, the instructions may be executed by a processor to implement the paging method provided in the third aspect.

The technical solutions provided in the embodiments of the present disclosure may have the following beneficial effects.

The core network device, when determining that the UE to which the SIM card to be paged is multi-SIM UE and multiple SIM cards of the multi-SIM UE belong to the same network operator's network, may determine the first base station currently accessed by the multi-SIM UE and then send the paging signaling of paging the SIM card to be paged to the first base station. As such, when the multiple SIM cards of the multi-SIM UE belong to the same network operator's network, the core network device intended to page one of the SIM cards may send paging signaling to the first base station accessed by a connected SIM card in a connection state. Therefore, the problem of paging resource waste caused by sending paging signaling to all base stations in a TA List when the core network device pages a SIM card of multi-SIM UE in the related art is solved.

It should be understood that the above general descriptions and the following detailed descriptions are only exemplary and explanatory and not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to embodiments, examples of which are illustrated in the accompanying drawings. The following description refers to the accompanying drawings in which the same numbers in different drawings represent the same or similar elements unless otherwise represented. The implementations set forth in the following description of embodiments do not represent all implementations consistent with the present disclosure. Instead, they are merely examples of apparatuses and methods consistent with aspects related to the present disclosure as recited in the appended claims.

The technical solutions provided in the present disclosure are applicable to a scene that multiple SIM cards of multi-SIM UE belong to the same network operator's network and one of the SIM cards of the multi-SIM UE is in an RRC connected state (RRC_CONNECTED) while the other one is in an RRC idle state (RRC_IDLE) or an RRC inactive state (RRC_INACTIVE).

Figure 1A:
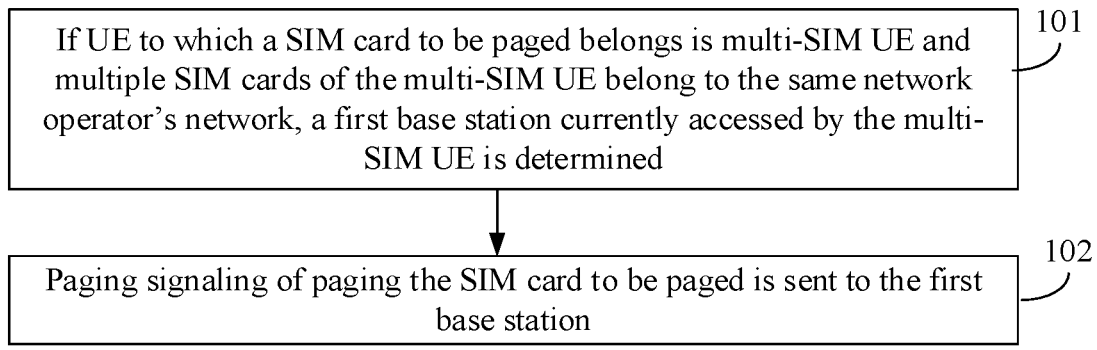
FIG. 1A is a flow chart showing a paging method, according to an embodiment.
Figure 1B:
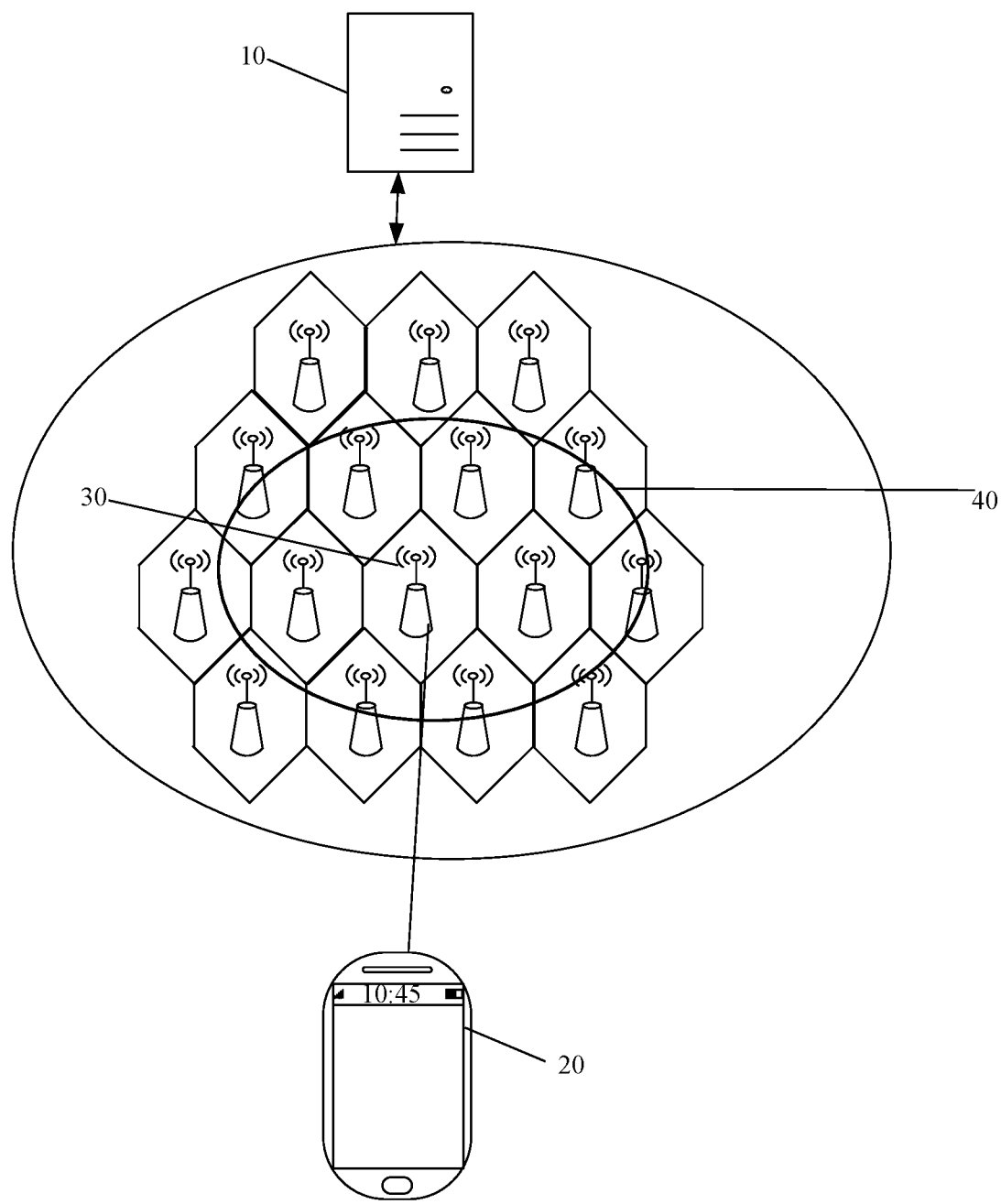
FIG. 1B is a diagram of an application scene of a paging method, according to an embodiment.

FIG. 1A is a flow chart showing a paging method, according to an embodiment. FIG. 1B is a diagram of an application scene of a paging method, according to an embodiment. The paging method may be applied to a core network device. As shown in FIG. 1A, the paging method includes the following Steps 101 to 103.

In Step 101, if UE to which a SIM card to be paged belongs is multi-SIM UE and multiple SIM cards of the multi-SIM UE belong to the same network operator's network, a first base station currently accessed by the multi-SIM UE is determined.

In an embodiment, the first base station is a base station currently in communication with a connected SIM card of the multi-SIM UE.

In an embodiment, in case that the SIM card to be paged belongs to the same network operator's network as a connected SIM card of the multi-SIM UE, it may be determined that the SIM card to be paged is in coverage of the first base station (that is, a base station accessed by the connected SIM card of the multi-SIM UE).

In an embodiment, if the multi-SIM UE has more than three SIM cards, it may be determined that the multiple SIM cards of the multi-SIM UE belong to the same network operator's network when two SIM cards of the multi-SIM UE belong to the same network operator's network. It may be determined that the SIM card to be paged is in coverage of the first base station (a base station accessed by a connected SIM card of the multi-SIM UE) when the SIM card to be paged belongs to the same network operator's network as the connected SIM card.

In an embodiment, the UE to which the SIM card to be paged belongs may be multi-SIM UE of which multiple SIM cards belong to the same network operator's network. For example, two SIM cards of a dual-SIM dual-standby terminal belong to the same network operator's network. In an embodiment, the UE to which the SIM card to be paged belongs may also be single-card UE. In an embodiment, the UE to which the SIM card to be paged belongs may also be multi-SIM UE of which multiple SIM cards belong to different network operator's networks. For example, one SIM card of a dual-SIM dual-standby terminal belongs to the first network operator's network while the other SIM card belongs to the second network operator's network. The technical solution of the present disclosure is applicable to a scene that paged UE to which a SIM card to be paged is multi-SIM UE of which multiple SIM cards belong to the same network operator's network.

In an embodiment, UE information of the multi-SIM UE may be reported to a core network by a SIM card of the multi-SIM UE through NAS signaling.

In an embodiment, UE information of the multi-SIM UE may be reported to a base station by a SIM card of the multi-SIM UE through access stratum signaling and then reported to a core network device by the base station. For example, a SIM card of the multi-SIM UE may report the UE information to the base station through RRC signaling. For example, when reporting a UE capability, the UE reports IMSIs of the multiple SIM cards of the UE and/or IMEIs corresponding to the SIM cards to the base station through UECapabilityInformation signaling.

In an embodiment, the core network device may record the IMSI of each SIM card of the multi-SIM UE and/or the IMEI corresponding to the SIM card in a local database after acquiring the UE information of the multi-SIM UE. Therefore, a user may query the local database to determine whether a UE type of the UE to which the SIM card to be paged belongs is multi-SIM UE of which multiple SIM cards belong to the same network operator's network, and if YES, determines that the UE type of the UE to which the SIM card to be paged belongs is multi-SIM UE of which multiple SIM cards belong to the same network operator's network.

In Step 102, paging signaling of paging the SIM card to be paged is sent to the first base station.

In an exemplary scene, as shown in FIG. 1B, a core network device 10, multi-SIM UE 20, a first base station 30 accessed by a connected SIM card in the multi-SIM UE 20 and a TA 40 determined based on a position of the multi-SIM UE (the TA includes multiple base stations and the accessed first base station 30) are included. The core network device 10 may send paging signaling only to the first base station 30 not to the other base stations in the TA 40 when there is a need to page an idle SIM card of the multi-SIM UE 20. Therefore, paging resources may be saved greatly, and paging resource waste may be avoided.

In the embodiment, through Steps 101 to 102, the core network device, when determining that the UE to which the SIM card to be paged is multi-SIM UE of which multiple SIM cards belong to the same network operator's network, may determine the first base station accessed by a connected SIM card, which has accessed the network, of the multi-SIM UE and then send the paging signaling of paging the SIM card to be paged to the first base station. As such, when the multiple SIM cards of the multi-SIM UE belong to the same network operator's network, the core network device intended to page one of the SIM cards may send paging signaling to the first base station accessed by a connected SIM card in a connection state. Therefore, the problem of paging resource waste caused by sending paging signaling to all base stations in a TA List when the core network device pages a SIM card of multi-SIM UE in the related art is solved.

The technical solutions provided in the embodiments of the present disclosure will be described below with specific embodiments.

Figure 2:
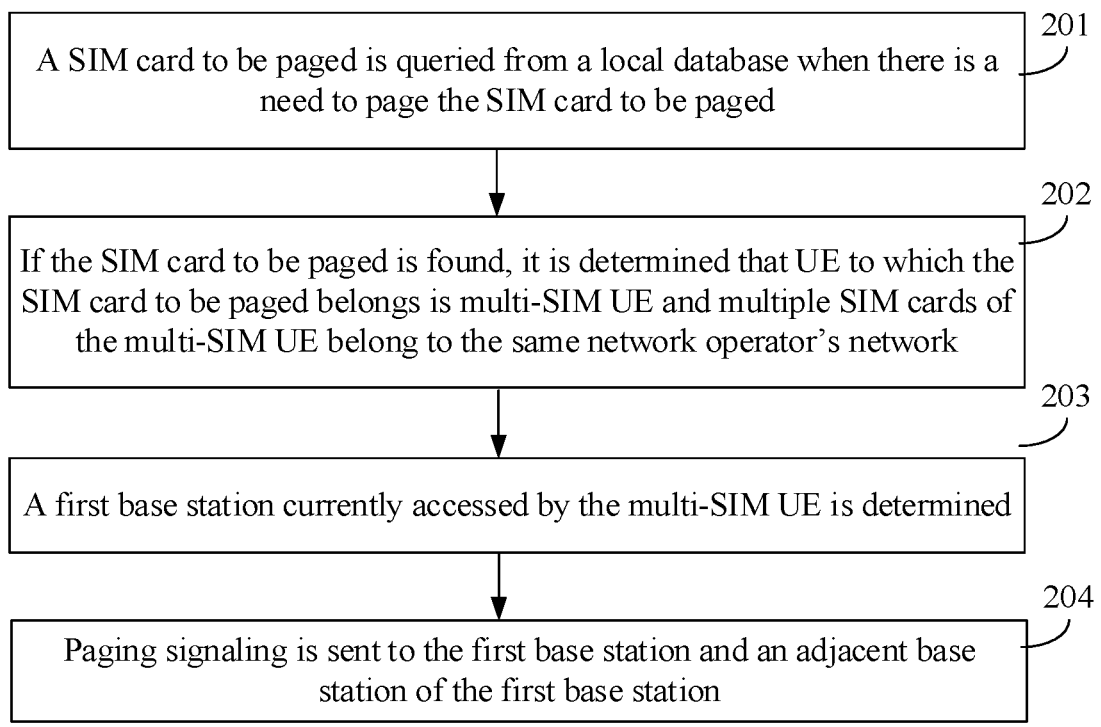
FIG. 2 is a flow chart showing another paging method, according to an embodiment.

FIG. 2 is a flow chart showing another paging method, according to an embodiment. How a core network device pages a SIM card to be paged of multi-SIM UE is exemplarily described in the embodiment based on the above-mentioned method provided in the embodiments of the present disclosure in combination with FIG. 1B. As shown in FIG. 2, the following steps are included.

In Step 201, a SIM card to be paged is queried from a local database when there is a need to page the SIM card to be paged.

In Step 202, if the SIM card to be paged is found, it is determined that UE to which the SIM card to be paged belongs is multi-SIM UE and multiple SIM cards of the multi-SIM UE belong to the same network operator's network.

In an embodiment, UE information of the multi-SIM UE may be reported to a core network by a SIM card of the multi-SIM UE through NAS signaling.

In an embodiment, UE information of the multi-SIM UE may be reported to a base station by a SIM card of the multi-SIM UE through access stratum signaling and then reported to a core network device by the base station. For example, a SIM card of the multi-SIM UE may report the UE information to the base station through RRC signaling. For example, when reporting a UE capability, the UE reports IMSIs of the multiple SIM cards of the UE and/or IMEIs corresponding to the SIM cards to the base station through UECapabilityInformation signaling.

In an embodiment, the core network device may record the IMSI of each SIM card of the multi-SIM UE and/or the IMEI corresponding to the SIM card in a local database after acquiring the UE information of the multi-SIM UE. Therefore, a user may query the local database to determine whether the UE to which the SIM card to be paged belongs is multi-SIM UE of which multiple SIM cards belong to the same network operator's network, and if YES, determines that a UE type of the UE to which the SIM card to be paged belongs is multi-SIM UE of which multiple SIM cards belong to the same network operator's network.

In Step 203, a first base station currently accessed by the multi-SIM UE is determined.

In an embodiment, an implementation mode of Step 203 may refer to the descriptions about Step 101 in the embodiment shown in FIG. 1A and will not be repeated herein.

In Step 204, paging signaling is sent to the first base station and an adjacent base station of the first base station.

In an embodiment, the paging signaling may be simultaneously sent to the first base station and the adjacent base station of the first base station, to increase the success rate of access of the SIM card to be paged to a base station. For example, in FIG. 1B, the core network device may send the paging signaling to the first base station 30 and a set number of adjacent base stations around the first base station 30. The set number may be a fixed value. Alternatively, the set number may be determined by the core network device based on a present network load condition.

In the embodiment, through Steps 201 to 204, the core network device may query the local database to determine whether the UE to which the SIM card to be paged belongs is multi-SIM UE and the multiple SIM cards of which belong to the same network operator's network, and when determining that the UE is multi-SIM UE and the multiple SIM cards of which belong to the same network operator's network, the core network device may further determine the first base station accessed by a connected SIM card, which has accessed the network, of the multi-SIM UE and then send the paging signaling of paging the SIM card to be paged to the first base station and the adjacent base station of the first base station. As such, when the multiple SIM cards of the multi-SIM UE belong to the same network operator's network, the core network device intended to page one of the SIM cards may send paging signaling to the first base station accessed by a connected SIM card in a connection state and the adjacent base station around. Therefore, not only is the success rate of network access increased, but also the problem of paging resource waste caused by sending paging signaling to all base stations in a TA List when the core network device pages a SIM card of multi-SIM UE in the related art is solved.

Figure 3:
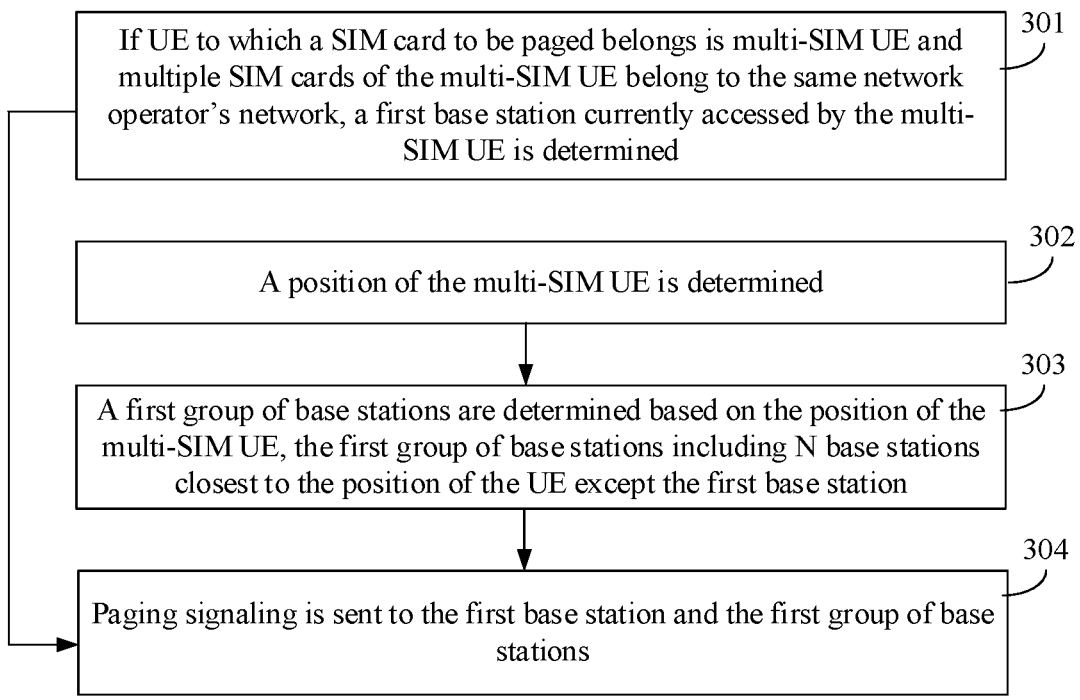
FIG. 3 is a flow chart showing another paging method, according to an embodiment.

FIG. 3 is a flow chart showing another paging method, according to an embodiment. How a core network device pages a SIM card to be paged of multi-SIM UE is exemplarily described in the embodiment based on the above-mentioned method provided in the embodiments of the present disclosure. As shown in FIG. 3, the following steps are included.

In Step 301, if UE to which a SIM card to be paged belongs is multi-SIM UE and multiple SIM cards of the multi-SIM UE belong to the same network operator's network, a first base station currently accessed by the multi-SIM UE is determined, and Step 304 is executed.

In an embodiment, an implementation mode of Step 301 may refer to the descriptions about Steps 101 to 102 in the embodiment shown in FIG. 1A and will not be repeated herein.

In Step 302, a position of the multi-SIM UE is determined.

In an embodiment, Steps 302 and 301 are executed in a random sequence. Step 302 may be executed before Step

301. Alternatively, Step 301 may be executed before Step 302. Alternatively, Steps 301 and 302 may be executed simultaneously.

In Step 303, a first group of base stations are determined based on the position of the multi-SIM UE, the first group of base stations including N base stations closest to the position of the UE except the first base station.

In an embodiment, N is a preset value, and may be a fixed value predetermined in a system protocol or a value determined by a core network device based on a network load condition.

In an embodiment, the first group of base stations may be determined based on the position of the multi-SIM UE, so as to increase the success rate of access of the SIM card to be paged to a base station and reduce paging resource waste as much as possible. The first group of base stations include the N base stations closest to the position of the UE except the first base station, so that the success rate of access of the SIM card to be paged may be increased greatly.

In an embodiment, the first number may be a fixed value predetermined in a communication protocol. In an embodiment, the first number may also be a dynamic value set by the core network device based on the network load condition.

In Step 304, paging signaling is sent to the first base station and the first group of base stations.

In the embodiment, through Steps 301 to 304, the core network device, when there is a need to page a SIM card, may also send the paging signaling to the N base stations closest to the multi-SIM UE, in addition to sending the paging signaling to the first base station accessed by a connected SIM card in a connection state of the multi-SIM UE. Therefore, through the technical solution of the embodiment, the problem of paging resource waste caused by sending paging signaling to all base stations in a TA List when a core network device pages a SIM card of multi-SIM UE in the related art may be solved on the basis of increasing the success rate of network access of the SIM card to be paged.

Figure 4:
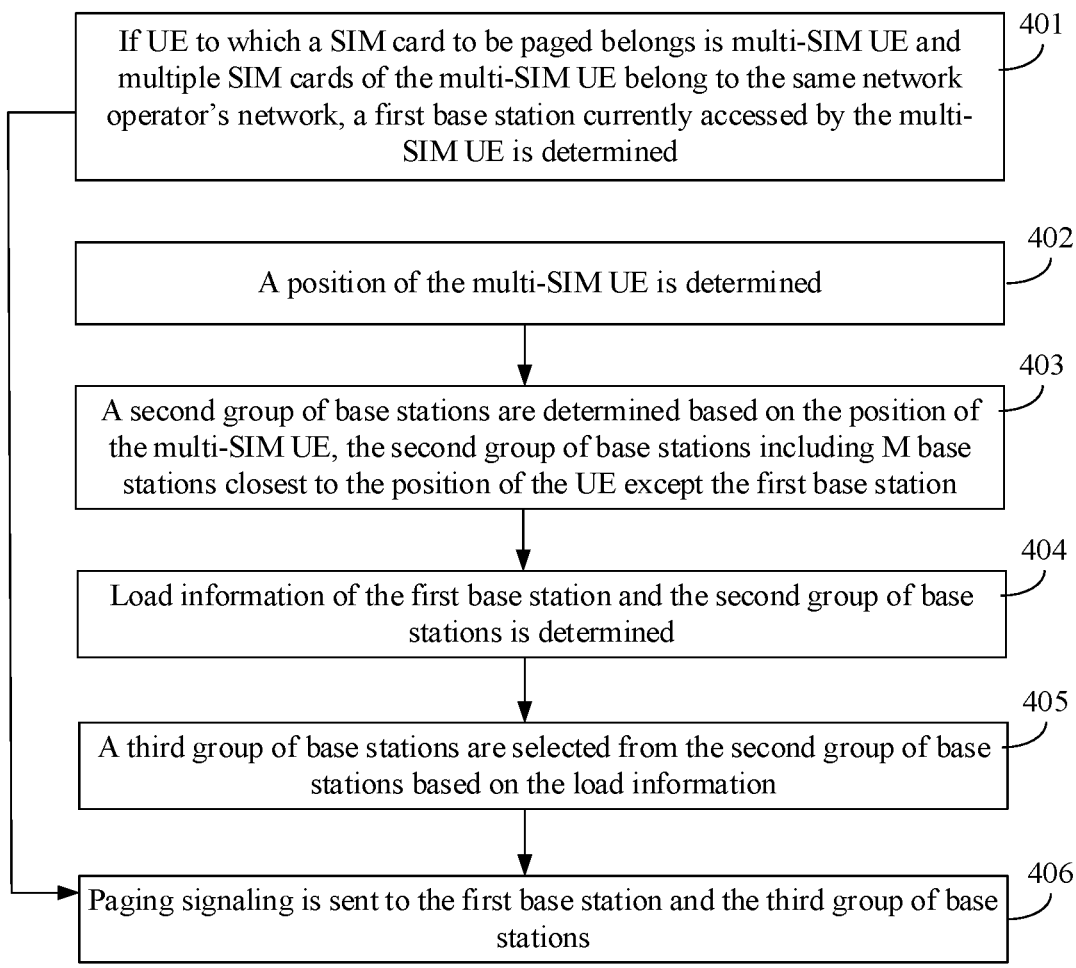
FIG. 4 is a flow chart showing another paging method, according to an embodiment.

FIG. 4 is a flow chart showing another paging method, according to an embodiment. How a core network device pages a SIM card to be paged of multi-SIM UE is exemplarily described in the embodiment based on the above-mentioned method provided in the embodiments of the present disclosure. As shown in FIG. 4, the following steps are included.

In Step 401, if UE to which a SIM card to be paged belongs is multi-SIM UE and multiple SIM cards of the multi-SIM UE belong to the same network operator's network, a first base station currently accessed by the multi-SIM UE is determined, and Step 406 is executed.

In an embodiment, an implementation mode of Step 401 may refer to the descriptions about Step 101 in the embodiment shown in FIG. 1A and will not be repeated herein.

In Step 402, a position of the multi-SIM UE is determined.

In an embodiment, Steps 402 and 401 are executed in a random sequence. Step 402 may be executed before Step 401. Alternatively, Step 401 may be executed before Step 402. Alternatively, Steps 401 and 402 may be executed simultaneously.

In Step 403, a second group of base stations are determined based on the position of the multi-SIM UE, the second group of base stations including M base stations closest to the position of the UE except the first base station.

In an embodiment, N is a preset value, and may be a fixed value predetermined in a system protocol or a value determined by a core network device based on a network load condition.

In an embodiment, the second group of base stations may be determined based on the position of the multi-SIM UE, so as to increase the success rate of access of the SIM card to be paged to a base station and reduce paging resource waste as much as possible. The second group of base stations include the M base stations closest to the position of the UE except the first base station, so that the success rate of access of the SIM card to be paged may be increased greatly. In an embodiment, the number of the first group of base stations may be the same as that of the second group of base stations. In an embodiment, the number of the first group of base stations may be different from that of the second group of base stations.

In an embodiment, the second number may be a fixed value predetermined in a communication protocol. In an embodiment, the second number may also be a dynamic value set by the core network device based on the network load condition.

In Step 404, load information of the first base station and the second group of base stations is determined.

In Step 405, a third group of base stations are selected from the second group of base stations based on the load information.

In Steps 404 and 405, the load information of the first base station and the second group of base stations may be measured based on the amounts of UE accessing the first base station and the second group of base stations. For example, if the second group of base stations include a base station 1, a base station 2 and a base station 3, the base station 1 has been accessed by 100 pieces of UE, the base station 2 has been accessed by 50 pieces of UE, and the base station 3 has been accessed by 30 pieces of UE, the base station 2 and the base station 3 may be selected to form the third group of base stations. In an embodiment, the load information of the first base station and the second group of base stations may also be measured based on data volumes of service data cached by the base stations. For example, the second group of base stations include the base station 1, the base station 2 and the base station 3, and a data volume of service data cached by the base station 1 is far larger than those of the base station 2 and the base station 3, the base station 2 and the base station 3 may be selected to form the third group of base stations. In an embodiment, the load information of the first base station and the second group of base stations may also be measured based on data volumes of service data cached by the base stations and the amounts of UE accessing the base stations. For example, if the second group of base stations include the base station 1, the base station 2 and the base station 3, the base station 1 has been accessed by 100 pieces of UE and has cached therein service data of a maximum data volume, the base station 2 has been accessed by 50 pieces of UE and has cached therein service data of a minimum data volume, and the base station 3 has been accessed by 30 pieces of UE and has cached therein service data of a data volume larger than that of the base station 2 and less than that of the base station 1, the base station 2 and the base station 3 may still be selected to form the third group of base stations.

In Step 406, paging signaling is sent to the first base station and the third group of base stations.

In an embodiment, the first base station and the third group of base stations selected from the second group of base stations are more likely to allow the SIM card to be paged to access, so that the paging signaling may be simultaneously sent to the first base station and the third group of base stations.

In the embodiment, through Steps 401 to 406, the core network device, when there is a need to page a SIM card, may also send the paging signaling to the third group of base stations which are closest to the multi-SIM UE and loaded not so heavily, in addition to sending the paging signaling to the first base station accessed by a connected SIM card in a connection state of the multi-SIM UE. Therefore, through the technical solution of the embodiment, the problem of paging resource waste caused by sending paging signaling to all base stations in a TA List when a core network device pages a SIM card of multi-SIM UE in the related art may be solved on the basis of increasing the success rate of network access of the SIM card to be paged.

Figure 5:
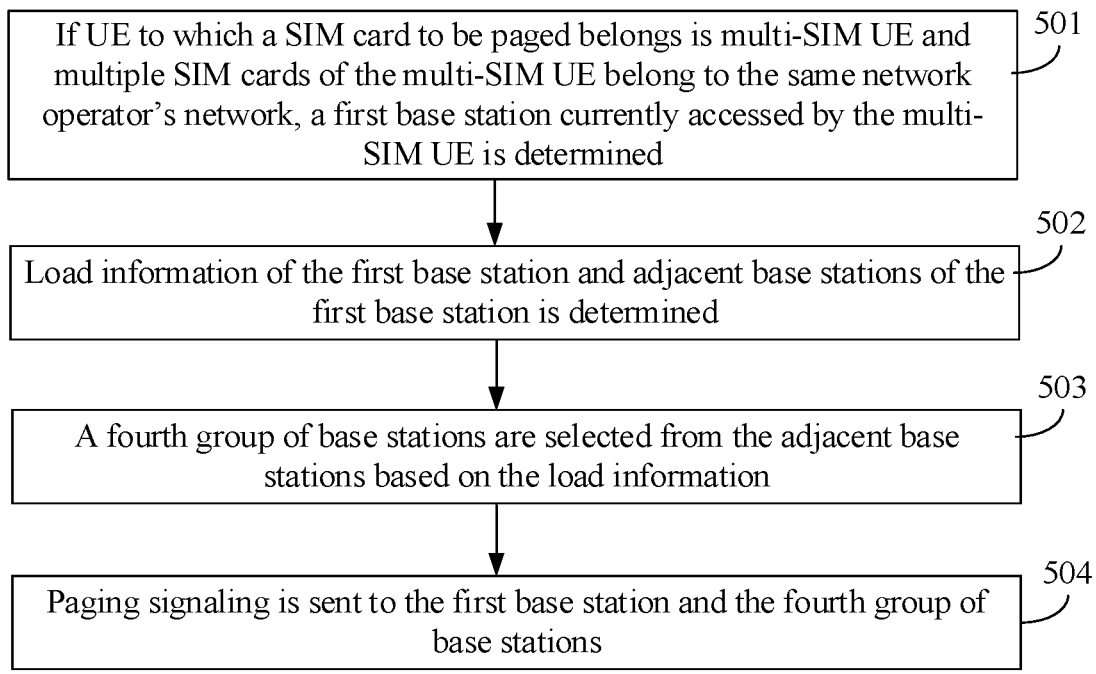
FIG. 5 is a flow chart showing another paging method, according to an embodiment.

FIG. 5 is a flow chart showing another paging method, according to an embodiment. How a core network device pages a SIM card to be paged of multi-SIM UE is exemplarily described in the embodiment based on the above-mentioned method provided in the embodiments of the present disclosure. As shown in FIG. 5, the following steps are included.

In Step 501, if UE to which a SIM card to be paged belongs is multi-SIM UE and multiple SIM cards of the multi-SIM UE belong to the same network operator's network, a first base station currently accessed by the multi-SIM UE is determined.

In an embodiment, an implementation mode of Step 501 may refer to the descriptions about Step 101 in the embodiment shown in FIG. 1A and will not be repeated herein.

In Step 502, load information of the first base station and adjacent base stations of the first base station is determined.

In Step 503, a fourth group of base stations are selected from the adjacent base stations based on the load information.

In Steps 502 and 503, the load information of the first base station and the adjacent base stations may be measured based on the amounts of UE accessing the first base station and the adjacent base stations. For example, if the adjacent base stations include a base station 1, a base station 2 and a base station 3, the base station 1 has been accessed by 100 pieces of UE, the base station 2 has been accessed by 50 pieces of UE, and the base station 3 has been accessed by 30 pieces of UE, the base station 2 and the base station 3 may be selected to form the fourth group of base stations. In an embodiment, the load information of the first base station and the adjacent base stations may also be measured based on data volumes of service data cached by the base stations. For example, the adjacent base stations include the base station 1, the base station 2 and the base station 3, and a data volume of service data cached by the base station 1 is far larger than those of the base station 2 and the base station 3, the base station 2 and the base station 3 may be selected to form the fourth group of base stations. In an embodiment, the load information of the first base station and the adjacent base stations may also be measured based on data volumes of service data cached by the base stations and the amounts of UE accessing the base stations. For example, if the adjacent base stations include the base station 1, the base station 2 and the base station 3, the base station 1 has been accessed by 100 pieces of UE and has cached therein service data of a maximum data volume, the base station 2 has been accessed by 50 pieces of UE and has cached therein service data of a minimum data volume, and the base station 3 has been accessed by 30 pieces of UE and has cached therein service data of a data volume larger than that of the base station 2 and less than that of the base station 1, the base station 2 and the base station 3 may still be selected to form the fourth group of base stations.

In Step 504, paging signaling is sent to the first base station and the fourth group of base stations.

In the embodiment, through Steps 501 to 504, the core network device, when there is a need to page a SIM card, may also send the paging signaling to the fourth group of base stations with minimum loads in the adjacent base stations of the first base station, in addition to sending the paging signaling to the first base station accessed by a connected SIM card in a connection state of the multi-SIM UE. Therefore, through the technical solution of the embodiment, the problem of paging resource waste caused by sending paging signaling to all base stations in a TA List when a core network device pages a SIM card of multi-SIM UE in the related art may be solved on the basis of increasing the success rate of network access of the SIM card to be paged.

Figure 6:
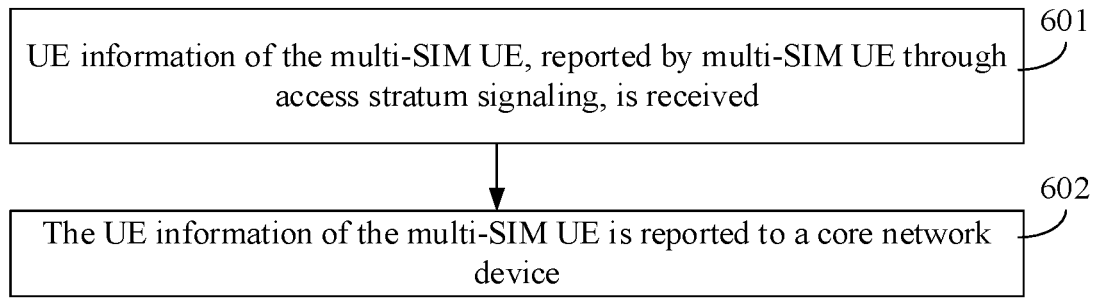
FIG. 6 is a flow chart showing a paging method, according to an embodiment.

FIG. 6 is a flow chart showing a paging method, according to an embodiment. The paging method may be applied to a base station device. As shown in FIG. 6, the paging method includes the following Steps 601 to 602.

In Step 601, UE information of the multi-SIM UE, reported by multi-SIM UE through access stratum signaling, is received.

In an embodiment, UE information of the multi-SIM UE includes IMSIs of SIM cards of the multi-SIM UE and/or IMEIs corresponding to the SIM cards.

In an embodiment, when multiple SIM cards of the multi-SIM UE belong to the same network operator's network, IMSIs of the multiple SIM cards belonging to the same network operator's network and/or IMEIs corresponding to the SIM cards may be reported to a core network device.

In an embodiment, UE information of the multi-SIM UE may also be reported to a base station by a SIM card of the multi-SIM UE through access stratum signaling and then reported to a core network device by the base station. For example, a SIM card of the multi-SIM UE may report the UE information to the base station through RRC signaling. For example, when reporting a UE capability, the UE reports IMSIs of the multiple SIM cards of the UE and/or IMEIs corresponding to the SIM cards to the base station through UECapabilityInformation signaling.

In Step 602, the UE information of the multi-SIM UE is reported to a core network device.

In the embodiment, through Steps 601 to 602, the UE may send the UE information of the multi-SIM UE to the base station through the access stratum signaling, and the base station receives and reports the UE information to the core network device. As such, the core network device, when there is a need to page a SIM card, may determine whether the SIM card to be paged belongs to the multi-SIM UE based on the stored UE information, and if YES, only sends paging signaling to a first base station accessed by a connected SIM card in a connection state of the multi-SIM UE or to the first base station and adjacent base stations around. Therefore, through the technical solution of the embodiment, the problem of paging resource waste caused by sending paging signaling to all base stations in a TA List when a core network device pages a SIM card of multi-SIM UE in the related art may be solved.

Figure 7:
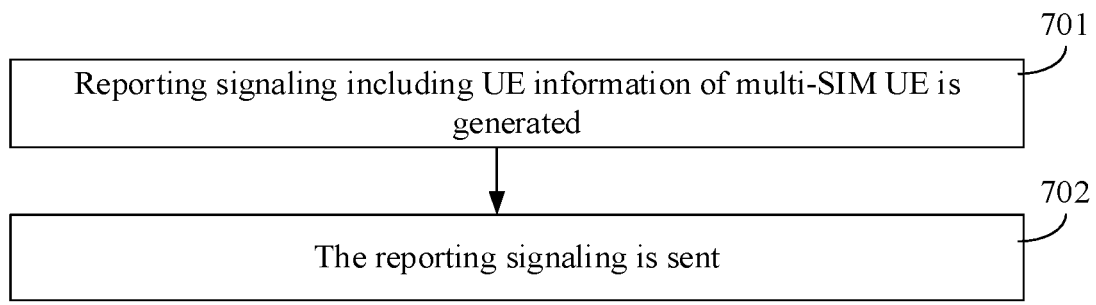
FIG. 7 is a flow chart showing a paging method, according to an embodiment.

FIG. 7 is a flow chart showing a paging method, according to an embodiment. The paging method may be applied to multi-SIM UE. As shown in FIG. 7, the paging method includes the following Steps 701 to 702.

In Step 701, reporting signaling including UE information of multi-SIM UE is generated.

In an embodiment, the UE information of the multi-SIM UE includes IMSIs of SIM cards of the multi-SIM UE and/or IMEIs corresponding to the SIM cards.

In an embodiment, when multiple SIM cards of the multi-SIM UE belong to the same network operator's network, IMSIs of the multiple SIM cards belonging to the same network operator's network and/or IMEIs corresponding to the SIM cards may be reported to a core network device.

In Step 702, the reporting signaling is sent.

In an embodiment, in Steps 701 to 702, the multi-SIM UE may generate NAS signaling including the UE information of the multi-SIM UE and directly send the NAS signaling to the core network device.

In an embodiment, in Steps 701 to 702, the multi-SIM UE may generate and report, to a base station, access stratum signaling including the UE information of the multi-SIM UE, and then the base station sends the UE information of the multi-SIM UE to the core network device.

In the embodiment, through Steps 701 to 702, the UE may send the UE information of the multi-SIM UE to the base station through the access stratum signaling, and the base station receives and reports the UE information to the core network device; or the UE may also directly send the UE information of the multi-SIM UE to the core network device through the NAS signaling. As such, the core network device, when there is a need to page a SIM card, may determine whether the SIM card to be paged belongs to the multi-SIM UE based on the stored UE information, and if YES, only sends paging signaling to a first base station accessed by a connected SIM card in a connection state of the multi-SIM UE or to the first base station and adjacent base stations around.

Figure 8:
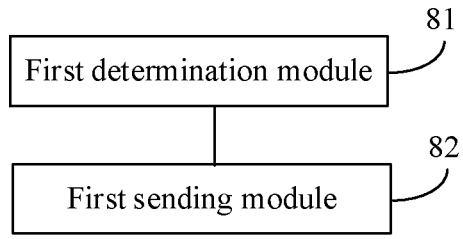
FIG. 8 is a block diagram of a paging apparatus, according to an embodiment.

FIG. 8 is a block diagram of a paging apparatus, according to an embodiment. The paging apparatus is applied to a core network device, and as shown in FIG. 8, includes: a first determination module 81 and a first sending module 82.

The first determination module 81 is configured to, when UE to which a SIM card to be paged belongs is multi-SIM UE and multiple SIM cards of the multi-SIM UE belong to the same network operator's network, determine a first base station currently accessed by the multi-SIM UE.

The first sending module 82 is configured to send paging signaling of paging the SIM card to be paged to the first base station determined by the first determination module 81.

Figure 9:
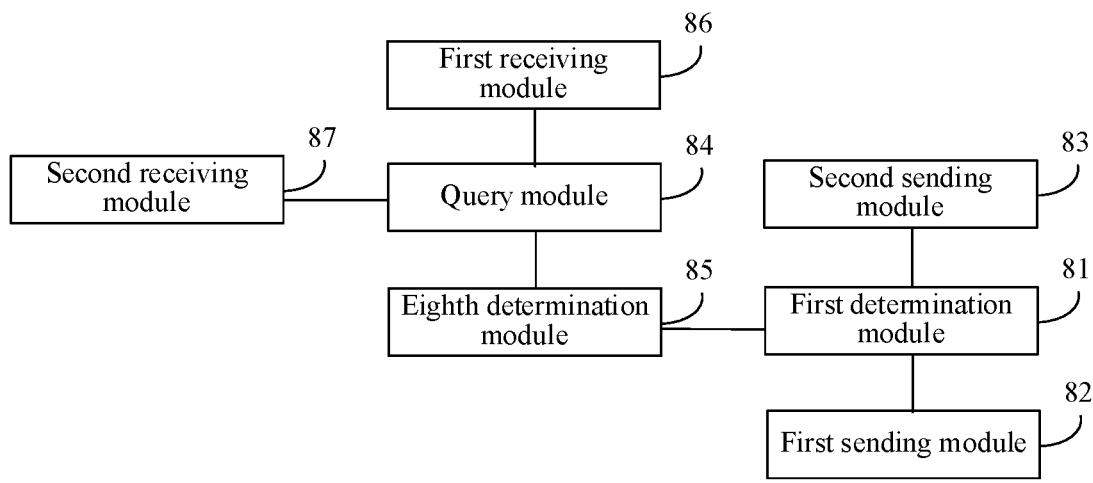
FIG. 9 is a block diagram of another paging apparatus, according to an embodiment.

FIG. 9 is a block diagram of another paging apparatus, according to an embodiment. As shown in FIG. 9, based on the embodiment shown in FIG. 8, in an embodiment, the apparatus further includes: a second sending module 83, configured to send the paging signaling to an adjacent base station of the first base station.

In an embodiment, the apparatus further includes: a query module 84 and an eighth determination module 85.

The query module 84 is configured to query the SIM card to be paged from a local database when there is a need to page the SIM card to be paged.

The eighth determination module 85 is configured to, when the query module 84 finds the SIM card to be paged, determine that the UE to which the SIM card to be paged belongs is multi-SIM UE and multiple SIM cards of the multi-SIM UE belong to the same network operator's network.

The local database records UE information of multi-SIM UE of which multiple SIM cards belong to the same network operator's network.

The UE information of the multi-SIM UE includes IMSIs of the SIM cards of the multi-SIM UE and/or IMEIs corresponding to the SIM cards.

In an embodiment, the apparatus further includes: a first receiving module 86, configured to receive the UE information, reported by the multi-SIM UE through NAS signaling, of the multi-SIM UE.

In an embodiment, the apparatus further includes: a second receiving module 87, configured to receive the UE information, reported by a base station accessed by the multi-SIM UE, of the multi-SIM UE, the UE information of the multi-SIM UE being reported to the base station by the multi-SIM UE through access stratum signaling.

Figure 10:
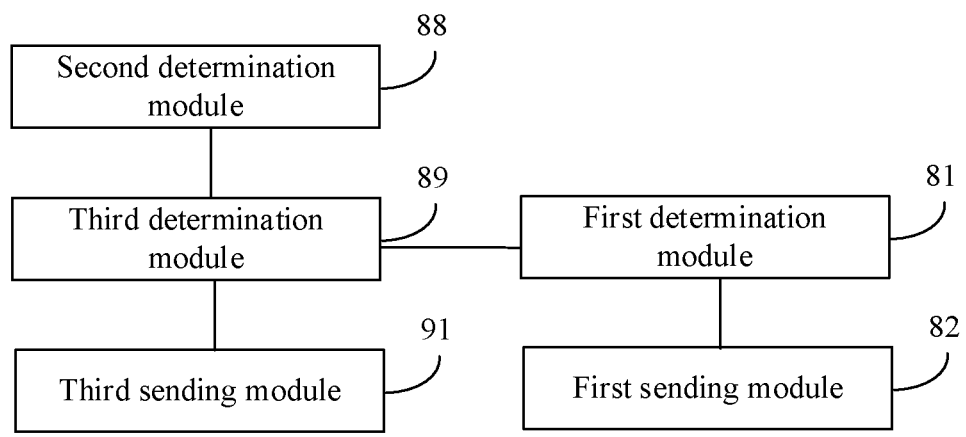
FIG. 10 is a block diagram of another paging apparatus, according to an embodiment.

FIG. 10 is a block diagram of another paging apparatus, according to an embodiment. As shown in FIG. 10, based on the embodiment shown in FIG. 8, in an embodiment, the apparatus further includes: a second determination module 88, a third determination module 89 and a third sending module 91.

The second determination module 88 is configured to determine a position of the multi-SIM UE.

The third determination module 89 is configured to determine a first group of base stations based on the position, determined by the second determination module 88, of the multi-SIM UE, the first group of base stations including N base stations closest to the position of the UE except the first base station and N being a preset value.

The third sending module 91 is configured to send the paging signaling to the first group of base stations determined by the third determination module 89.

Figure 11:
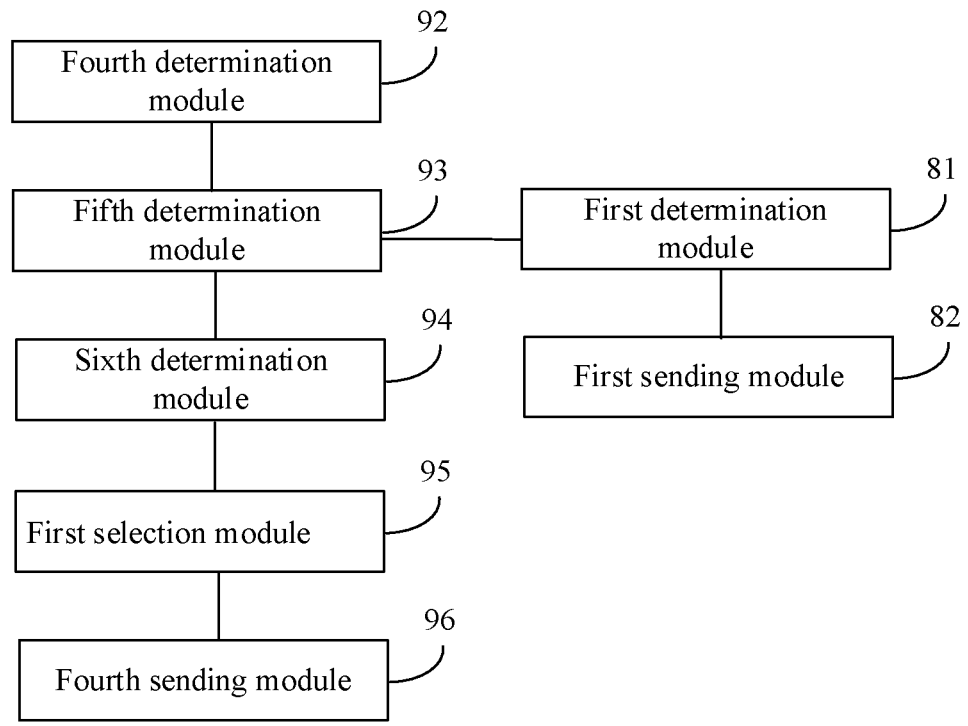
FIG. 11 is a block diagram of another paging apparatus, according to an embodiment.

FIG. 11 is a block diagram of another paging apparatus, according to an embodiment. As shown in FIG. 11, based on the embodiment shown in FIG. 8, in an embodiment, the apparatus further includes: a fourth determination module 92, a fifth determination module 93, a sixth determination module 94, a first selection module 95 and a fourth sending module 96.

The fourth determination module 92 is configured to determine a position of the multi-SIM UE.

The fifth determination module 93 is configured to determine a second group of base stations based on the position, determined by the fourth determination module 92, of the multi-SIM UE, the second group of base stations including M base stations closest to the position of the UE except the first base station and M being a preset value.

The sixth determination module 94 is configured to determine load information of the first base station and the second group of base stations.

The first selection module 95 is configured to select a third group of base stations from the second group of base stations based on the load information determined by the sixth determination module 94.

The fourth sending module 96 is configured to send the paging signaling to the third group of base stations.

Figure 12:
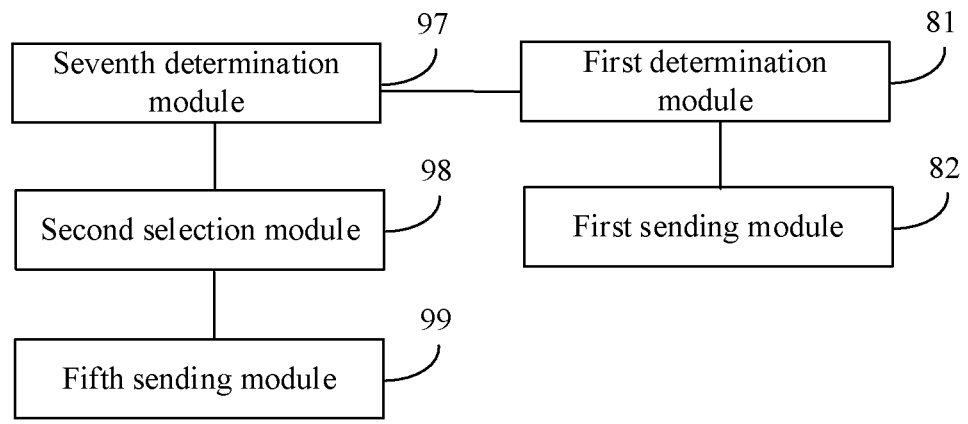
FIG. 12 is a block diagram of another paging apparatus, according to an embodiment.

FIG. 12 is a block diagram of another paging apparatus, according to an embodiment. As shown in FIG. 12, based on the embodiment shown in FIG. 8, in an embodiment, the apparatus further includes the following modules.

In an embodiment, the apparatus further includes: a seventh determination module 97, a second selection module 98 and a fifth sending module 99.

The seventh determination module 97 is configured to determine load information of the first base station and adjacent base stations of the first base station.

The second selection module 98 is configured to select a fourth group of base stations from the adjacent base stations based on the load information.

The fifth sending module 99 is configured to send the paging signaling to the fourth group of base stations.

Based on the paging apparatus provided in the embodiments shown in FIGS. 8 to 12, the core network device, when determining that the UE to which the SIM card to be paged belongs is multi-SIM UE of which multiple SIM cards belong to the same network operator's network, may send the paging signaling of paging the SIM card to be paged to the accessed first base station or to the first base station and eligible base stations around. Therefore, the problem of paging resource waste caused by sending paging signaling to all base stations in a TA List when a core network device pages a SIM card of multi-SIM UE in the related art is solved.

Figure 13:
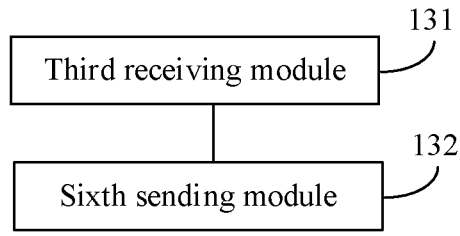
FIG. 13 is a block diagram of a paging apparatus, according to an embodiment.

FIG. 13 is a block diagram of a paging apparatus, according to an embodiment. The paging apparatus is applied to a base station, and as shown in FIG. 13, includes: a third receiving module 131 and a sixth sending module 132.

The third receiving module 131 is configured to receive UE information of the multi-SIM UE, reported by multi-SIM UE through access stratum signaling, where the UE information of the multi-SIM UE includes IMSIs of SIM cards of the multi-SIM UE and/or IMEIs corresponding to the SIM cards.

The sixth sending module 132 is configured to report the UE information of the multi-SIM UE to a core network device.

In an embodiment, the third receiving module 131 is configured to receive the UE information, reported by the multi-SIM UE through RRC signaling, of the multi-SIM UE.

Based on the paging apparatus provided in the embodiment shown in FIG. 13, the base station, after receiving the UE information of the multi-SIM UE, may report the UE information to the core network device. As such, the core network device, when there is a need to page a SIM card, may determine whether the SIM card to be paged belongs to the multi-SIM UE based on the stored UE information, and if YES, only sends paging signaling to a first base station accessed by a connected SIM card in a connection state of the multi-SIM UE or to the first base station and eligible adjacent base stations around. Therefore, through the technical solution of the embodiment, the problem of paging resource waste caused by sending paging signaling to all base stations in a TA List when a core network device pages a SIM card of multi-SIM UE in the related art may be solved.

Figure 14:
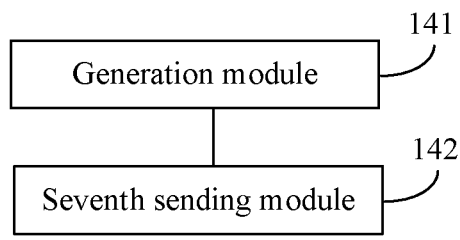
FIG. 14 is a block diagram of a paging apparatus, according to an embodiment.

FIG. 14 is a block diagram of a paging apparatus, according to an embodiment. The paging apparatus is applied to UE, and as shown in FIG. 14, includes: a generation module 141 and a seventh sending module 142.

The generation module 141 is configured to generate reporting signaling including UE information of the multi-SIM UE, the UE information of the multi-SIM UE including IMSIs of SIM cards of the multi-SIM UE and/or IMEIs corresponding to the SIM cards.

The seventh sending module 142 is configured to send the reporting signaling.

Figure 15:
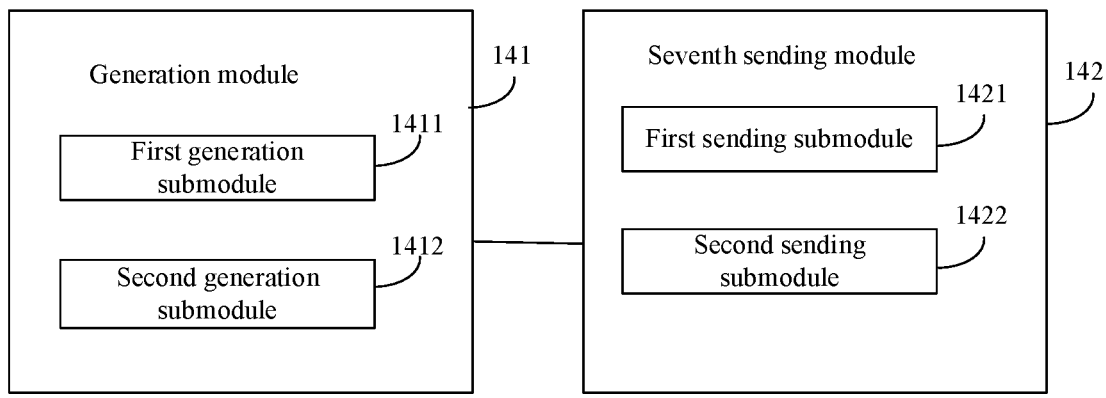
FIG. 15 is a block diagram of another paging apparatus, according to an embodiment.

FIG. 15 is a block diagram of another paging apparatus, according to an embodiment. As shown in FIG. 15, based on the embodiment shown in FIG. 14, in an embodiment, the generation module 141 includes: a first generation submodule 1411, configured to generate NAS signaling including the UE information of the multi-SIM UE.

The seventh sending module 142 includes: a first sending submodule 1421, configured to send the NAS signaling to a core network device.

In an embodiment, the generation module 141 includes: a second generation submodule 1412, configured to generate access stratum signaling including the UE information of the multi-SIM UE.

The seventh sending module 142 includes: a second sending submodule 1422, configured to send the access stratum signaling to a base station.

Based on the paging apparatus provided in the embodiments shown in FIGS. 14 to 15, the UE may send the UE information of the multi-SIM UE to the base station through the access stratum signaling, and the base station receives and reports the UE information to the core network device; or the UE may also directly send the UE information of the multi-SIM UE to the core network device through the NAS signaling. As such, the core network device, when there is a need to page a SIM card, may determine whether the SIM card to be paged belongs to the multi-SIM UE based on the stored UE information, and if YES, only sends paging signaling to a first base station accessed by a connected SIM card in a connection state of the multi-SIM UE or to the first base station and adjacent base stations around.

The apparatus embodiment substantially corresponds to the method embodiment, and thus related parts refer to part of descriptions of the method embodiment. The apparatus embodiment described above is only schematic. Units described as separate parts therein may or may not be physically separated. Parts displayed as units may or may not be physical units, and namely may be located in the same place or may also be distributed to multiple network units. Part or all of the modules therein may be selected according to a practical requirement to achieve the purpose of the solutions of the present disclosure. Those of ordinary skill in the art may understand and implement without creative work.

The present disclosure also provides a non-transitory computer-readable storage medium having stored therein a computer program which is configured to execute the paging method provided in any one of FIGS. 1A to 5.

The present disclosure also provides a non-transitory computer-readable storage medium having stored therein a computer program which is configured to execute the paging method provided in FIG. 6.

The present disclosure also provides a non-transitory computer-readable storage medium having stored therein a computer program which is configured to execute the paging method provided in FIG. 7.

The present disclosure also provides a core network device, which includes: a processor; and a memory configured to store instructions executable by the processor. The processor is configured to:
    if UE to which a SIM card to be paged belongs is multi-SIM UE and multiple SIM cards of the multi-SIM UE belong to the same network operator's network, determine a first base station currently accessed by the multi-SIM UE; and
    send paging signaling of paging the SIM card to be paged to the first base station.

The present disclosure also provides a base station, which includes: a processor; and a memory configured to store instructions executable by the processor. The processor is configured to:
    receive UE information of the multi-SIM UE, reported by multi-SIM UE through access stratum signaling, where the UE information of the multi-SIM UE includes IMSIs of SIM cards of the multi-SIM UE and/or IMEIs corresponding to the SIM cards; and report the UE information of the multi-SIM UE to a core network device.

The present disclosure also provides multi-SIM UE, which includes: a processor; and a memory configured to store instructions executable by the processor. The processor is configured to:

generate reporting signaling including UE information of the multi-SIM UE, the UE information of the multi-SIM UE including IMSIs of SIM cards of the multi-SIM UE and/or IMEIs corresponding to the SIM cards; and send the reporting signaling.

Figure 16:
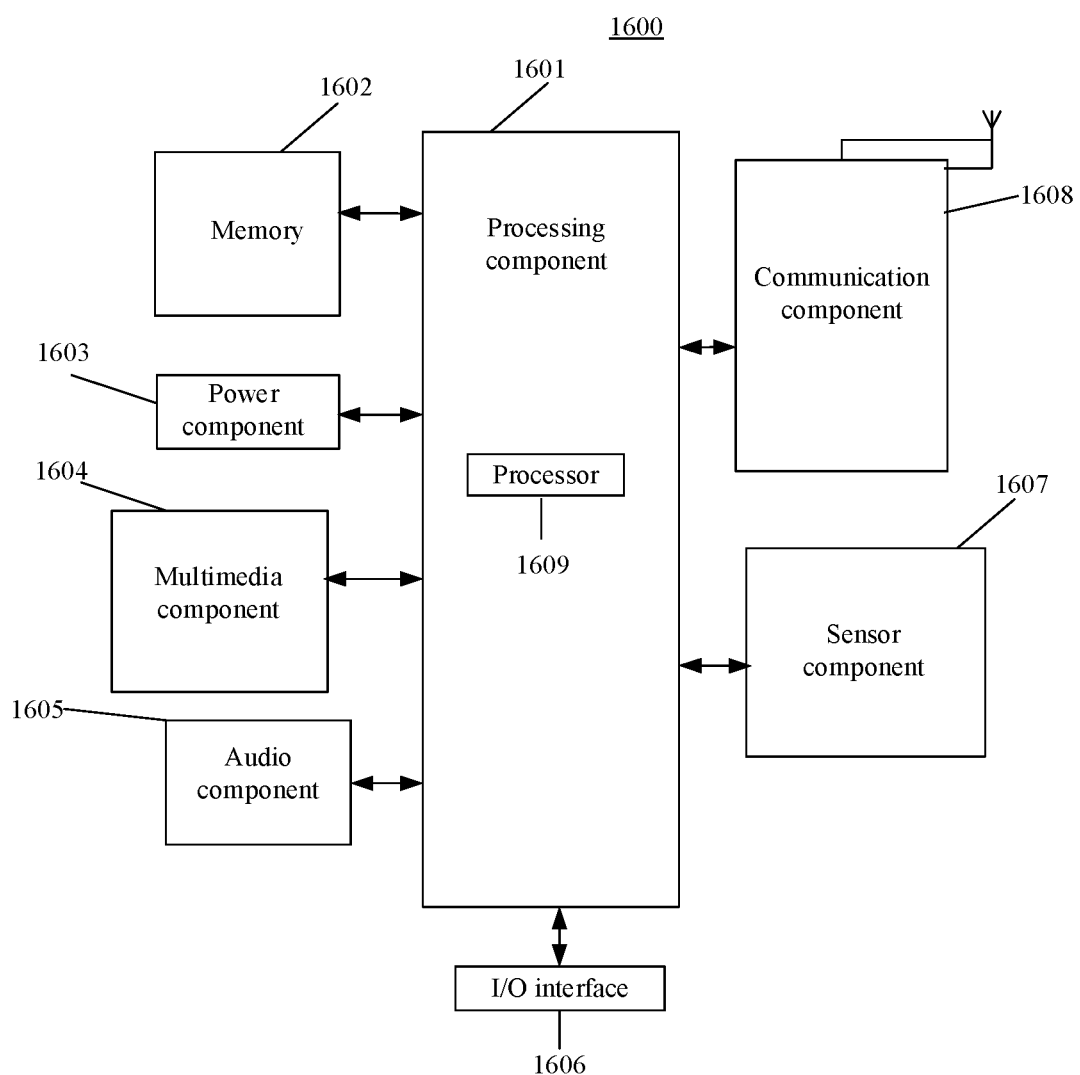
FIG. 16 is a block diagram of an apparatus applicable to paging, according to an embodiment.

FIG. 16 is a block diagram of an apparatus applicable to paging, according to an embodiment. FIG. 16 illustrates a paging apparatus 1600, according to an embodiment. The apparatus 1600 may be a terminal such as a computer, a mobile phone, a digital broadcast terminal, a messaging device, a gaming console, a tablet, a medical device, exercise equipment and a personal digital assistant. There are arranged in the apparatus multiple SIM cards, and the multiple SIM cards belong to the same network operator's network.

Referring to FIG. 16, the apparatus 1600 may include one or more of the following components: a processing component 1601, a memory 1602, a power component 1603, a multimedia component 1604, an audio component 1605, an Input/Output (I/O) interface 1606, a sensor component 1607, or a communication component 1608.

The processing component 1601 typically controls overall operations of the apparatus 1600, such as the operations associated with display, telephone calls, data communications, camera operations, and recording operations. The processing component 1601 may include one or more processors 1609 to execute instructions to perform all or part of the steps in the above-mentioned method. Moreover, the processing component 1601 may include one or more modules which facilitate interaction between the processing component 1601 and other components. For instance, the processing component 1601 may include a multimedia module to facilitate interaction between the multimedia component 1604 and the processing component 1601.

The memory 1602 is configured to store various types of data to support the operation of the apparatus 1600. Examples of such data include instructions for any applications or methods operated on the apparatus 1600, contact data, phonebook data, messages, pictures, video, and the like. The memory 1602 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 1603 provides power for each component of the apparatus 1600. The power component 1603 may include a power management system, one or more power supplies, and other components associated with generation, management and distribution of power for the apparatus 1600.

The multimedia component 1604 includes a screen providing an output interface between the apparatus 1600 and a user. In some embodiments, the screen may include a Liquid Crystal Display (LCD) and a Touch Panel (TP). If the screen includes the TP, the screen may be implemented as a touch screen to receive input signals from the user. The TP includes one or more touch sensors to sense touches, swipes and gestures on the TP. The touch sensors may not only sense a boundary of a touch or swipe action, but also sense a period of time and a pressure associated with the touch or swipe action. In some embodiments, the multimedia component 1604 includes a front camera and/or a rear camera. The front camera and/or the rear camera may receive external multimedia data when the apparatus 1600 is in an operation mode, such as a photographing mode or a video mode. Each of the front camera and the rear camera may be a fixed optical lens system or have focusing and optical zooming capabilities.

The audio component 1605 is configured to output and/or input an audio signal. For example, the audio component 1605 includes a Microphone (MIC). The MIC is configured to receive an external audio signal when the apparatus 1600 is in an operation mode, such as a call mode, a recording mode and a voice recognition mode. The received audio signal may further be stored in the memory 1602 or sent through the communication component 1608. In some embodiments, the audio component 1605 further includes a speaker configured to output the audio signal.

The I/O interface 1606 provides an interface between the processing component 1601 and peripheral interface modules, such as a keyboard, a click wheel, buttons and the like. The buttons may include, but are not limited to: a home button, a volume button, a starting button, and a locking button.

The sensor component 1607 includes one or more sensors configured to provide status assessments in various aspects for the apparatus 1600. For instance, the sensor component 1607 may detect an on/off status of the apparatus 1600 and relative positioning of components, such as a display and small keyboard of the apparatus 1600. The sensor component 1607 may further detect a change in a position of the apparatus 1600 or a component of the apparatus 1600, presence or absence of contact between the user and the apparatus 1600, orientation or acceleration/deceleration of the apparatus 1600 and a change in temperature of the apparatus 1600. The sensor component 1607 may include a proximity sensor configured to detect the presence of an object nearby without any physical contact. The sensor component 1607 may also include a light sensor, such as a Complementary Metal Oxide Semiconductor (CMOS) or Charge Coupled Device (CCD) image sensor, configured for use in an imaging application. In some embodiments, the sensor component 1607 may also include an acceleration sensor, a gyroscope sensor, a magnetic sensor, a pressure sensor, or a temperature sensor.

The communication component 1608 is configured to facilitate wired or wireless communication between the apparatus 1600 and other devices. The apparatus 1600 may access a communication-standard-based wireless network, such as a Wireless Fidelity (WiFi) network, a 2nd-Generation (2G) or 3rd-Generation (3G) network, or a combination thereof. In an embodiment, the communication component 1608 receives a broadcast signal or broadcast associated information from an external broadcast management system through a broadcast channel. In an embodiment, the communication component 1608 further includes a Near Field Communication (NFC) module to facilitate short-range communication. For example, the NFC module may be implemented based on a Radio Frequency Identification (RFID) technology, an Infrared Data Association (IrDA) technology, an Ultra-Wide Band (UWB) technology, a Bluetooth (BT) technology and other technologies.

In an embodiment, the apparatus 1600 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the above-mentioned method.

In an embodiment, there is also provided a non-transitory computer-readable storage medium including instructions, such as included in the memory 1602, executable by the processor 1608 of the apparatus 1600 for performing the above-mentioned method. For example, the non-transitory computer-readable storage medium may be a ROM, a Random Access Memory (RAM), a Compact Disc Read-Only Memory (CD-ROM), a magnetic tape, a floppy disc, an optical data storage device, etc.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

Figure 17:
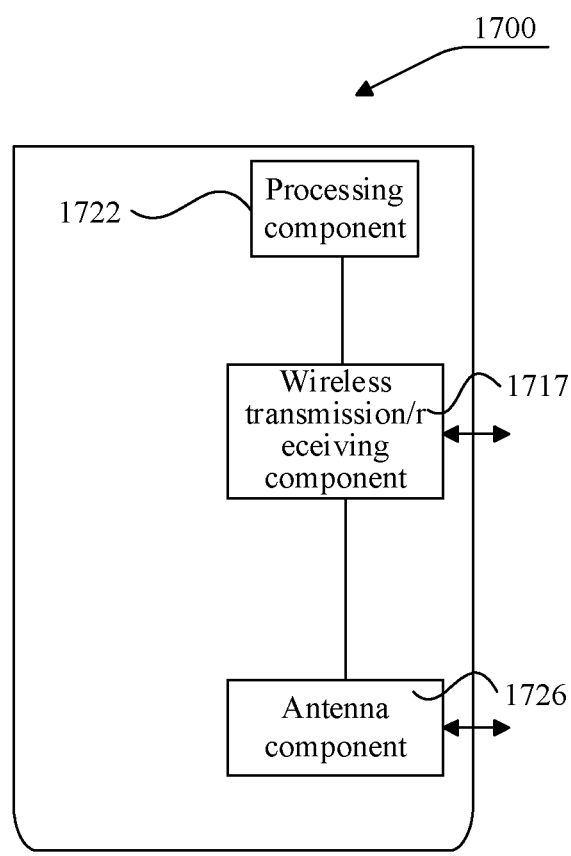
FIG. 17 is a block diagram of an apparatus applicable to paging, according to an embodiment.

FIG. 17 is a block diagram of an apparatus applicable to paging, according to an embodiment. The apparatus 1700 may be provided as a base station or a core network device. Referring to FIG. 17, the apparatus 1700 includes a processing component 1722, a wireless transmission/receiving component 1717, an antenna component 1726 and a wireless interface-specific signal processing part. The processing component 1722 may further include one or more processors.

One of the processors of the processing component 1722 may be configured to execute the paging method executed by the base station side. Alternatively, one of the processors of the processing component 1722 may be configured to execute the paging method executed by the core network device.

Other implementation solutions of the present disclosure will be apparent to those skilled in the art from consideration of the specification and practice of the present disclosure. This present application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. A paging method, applied to a core network device and comprising:
   receiving, by the core network device, User Equipment (UE) information of multi-SIM UE from a base station accessed by the multi-SIM UE, the UE information of the multi-SIM UE being firstly received by the base station from the multi-SIM UE through access stratum signaling;
   recording, by the core network device, the UE information of the multi-SIM UE in a local database;
   querying, by the core network device, a Subscriber Identification Module (SIM) card to be paged from the local database in response to determining that there is a need to page the SIM card to be paged;
   in case that the SIM card to be paged is found, determining, by the core network device, that UE to which the SIM card to be paged belongs is the multi-SIM UE and that multiple SIM cards of the multi-SIM UE belong to a same network operator's network;
   determining, by the core network device, a first base station currently being accessed by the multi-SIM UE; and
   sending, by the core network device to the first base station and an adjacent base station of the first base station, paging signaling for paging the SIM card to be paged;
   wherein the local database records the UE information of the multi-SIM UE of which multiple SIM cards belong to the same network operator's network; and the UE information of the multi-SIM UE comprises at least one of: International Mobile Subscriber Identification Numbers (IMSIs) of the SIM cards of the multi-SIM UE, or International Mobile Equipment Identities (IMEIs) corresponding to the SIM cards.

2. The method of claim 1, further comprising:
   determining, by the core network device, a position of the multi-SIM UE;
   determining, by the core network device, a first group of base stations based on the position of the multi-SIM UE, wherein the first group of base stations comprise N base stations closest to the position of the UE except the first base station and N is a preset value; and
   sending, by the core network device, the paging signaling to the first group of base stations.

3. The method of claim 1, further comprising:
   determining, by the core network device, a position of the multi-SIM UE;
   determining, by the core network device, a second group of base stations based on the position of the multi-SIM UE, wherein the second group of base stations comprises M base stations closest to the position of the UE except the first base station and M being a preset value;
   determining, by the core network device, load information of the first base station and the second group of base stations;
   selecting, by the core network device, a third group of base stations from the second group of base stations based on the load information; and
   sending, by the core network device, the paging signaling to the third group of base stations.

4. The method of claim 1, further comprising:
   determining, by the core network device, load information of the first base station and adjacent base stations of the first base station;
   selecting, by the core network device, a fourth group of base stations from the adjacent base stations based on the load information; and
   sending, by the core network device, the paging signaling to the fourth group of base stations.

5. A core network device, comprising:
   a processor; and
   a memory configured to store instructions executable by the processor;
   wherein the processor is configured to implement the method of claim 1.

6. A non-transitory computer-readable storage medium having computer instructions stored therein, wherein the instructions are executed by a processor to execute the paging method of claim 1.

7. A paging method, applied to a base station and comprising:
receiving, by the base station, User Equipment (UE) information of multi-SIM UE from the multi-SIM UE through access stratum signaling, wherein the UE information of the multi-SIM UE comprises at least one of: International Mobile Subscriber Identification Numbers (IMSIs) of Subscriber Identification Module (SIM) cards of the multi-SIM UE, or International Mobile Equipment Identities (IMEIs) corresponding to the SIM cards; and
reporting, by the base station, the UE information of the multi-SIM UE to a core network device, wherein the UE information of the multi-SIM UE is recorded by the core network device in a local database when the UE information of the multi-SIM UE is received by the core network device, and
wherein UE to which a SIM card to be paged belongs is the multi-SIM UE, and a paging signaling for paging the SIM card to be paged is sent by the core network device to a first base station currently being accessed by the multi-SIM UE and an adjacent base station of the first base station.

8. The method of claim 7, wherein the method further comprises:
receiving, by the base station, the UE information of the multi-SIM UE from the multi-SIM UE through Radio Resource Control (RRC) signaling.

9. A base station, comprising:
a processor; and
a memory configured to store instructions executable by the processor;
wherein the processor is configured to implement the method of claim 7.

10. A non-transitory computer-readable storage medium having computer instructions stored therein, wherein the instructions are executed by a processor to execute the paging method of claim 7.

11. A paging method, applied to multi-SIM User Equipment (UE) and comprising:
generating, by the multi-SIM UE, access stratum signaling comprising UE information of the multi-SIM UE, wherein the UE information of the multi-SIM UE comprises at least one of: International Mobile Subscriber Identification Numbers (IMSIs) of Subscriber Identification Module (SIM) cards of the multi-SIM UE, or International Mobile Equipment Identities (IMEIs) corresponding to the SIM cards; and
sending, by the multi-SIM UE, the access stratum signaling to a base station so that the base station reports the access stratum signaling to a core network device,
wherein the UE information of the multi-SIM UE comprised in the access stratum signaling is recorded by the core network device in a local database when the access stratum signaling is received by the core network device, and
wherein UE to which a SIM card to be paged belongs is the multi-SIM UE, and a paging signaling for paging the SIM card to be paged is sent by the core network device to a first base station currently being accessed by the multi-SIM UE and an adjacent base station of the first base station.

12. Multi-SIM User Equipment (UE), comprising:
a processor; and
a memory configured to store instructions executable by the processor;
wherein the processor is configured to implement the method of claim 11.

13. A non-transitory computer-readable storage medium having computer instructions stored therein, wherein the instructions are executed by a processor to execute the paging method of claim 11.

* * * * *